(12) United States Patent
Asayama

(10) Patent No.: US 11,625,816 B2
(45) Date of Patent: Apr. 11, 2023

(54) LEARNING DEVICE, IMAGE GENERATION DEVICE, LEARNING METHOD, IMAGE GENERATION METHOD, AND PROGRAM

(71) Applicant: Sony Interactive Entertainment Inc., Tokyo (JP)

(72) Inventor: Hirotaka Asayama, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/056,806

(22) PCT Filed: Jun. 11, 2018

(86) PCT No.: PCT/JP2018/022259
§ 371 (c)(1),
(2) Date: Nov. 19, 2020

(87) PCT Pub. No.: WO2019/239462
PCT Pub. Date: Dec. 19, 2019

(65) Prior Publication Data
US 2021/0125317 A1 Apr. 29, 2021

(51) Int. Cl.
*G06T 5/00* (2006.01)
*G06N 20/00* (2019.01)
(Continued)

(52) U.S. Cl.
CPC .............. *G06T 5/009* (2013.01); *G06N 5/04* (2013.01); *G06N 20/00* (2019.01); *G06T 3/40* (2013.01); *G06T 2207/20208* (2013.01)

(58) Field of Classification Search
CPC . G06T 5/009; G06T 3/00; G06T 2207/20084; G06N 20/00; G06N 3/0454
See application file for complete search history.

(56) References Cited

U.S. PATENT DOCUMENTS

| 2011/0216222 | A1* | 9/2011 | Niyagawa | H04N 5/76 348/E5.031 |
| 2018/0359416 | A1* | 12/2018 | Hold-Geoffroy | G06N 3/08 |

(Continued)

FOREIGN PATENT DOCUMENTS

| JP | 2008016918 A | 1/2008 |
| JP | 2011138314 A | 7/2011 |

OTHER PUBLICATIONS

International Search Report for corresponding PCT Application No. PCT/JP2018/022259, 2 pages, dated Aug. 14, 2018.
(Continued)

*Primary Examiner* — Phi Hoang
(74) *Attorney, Agent, or Firm* — Matthew B. Dernier, Esq.

(57) ABSTRACT

A second learning data acquisition section acquires an input image. A wide angle-of-view image generation section generates, in response to an input of the input image, a generated wide angle-of-view image that is an image having a wider angle of view than the input image. The second learning data acquisition section acquires a comparative wide angle-of-view image that is an image to be compared with the generated wide angle-of-view image. A second learning section performs learning for the wide angle-of-view image generation section by, on the basis of a comparison result between the generated wide angle-of-view image and the comparative wide angle-of-view image, updating parameter values of the wide angle-of-view image generation section such that, according to the luminance levels of pixels in the comparative wide angle-of-view image or the luminance levels of pixels in the generated wide angle-of-view image, update amounts of the parameter values concerning the pixels are increased.

9 Claims, 10 Drawing Sheets

(51) Int. Cl.
   *G06N 5/04*    (2023.01)
   *G06T 3/40*    (2006.01)

(56) References Cited

U.S. PATENT DOCUMENTS

| | | | | |
|---|---|---|---|---|
| 2019/0004533 | A1* | 1/2019 | Huang | H04N 5/2258 |
| 2019/0080440 | A1* | 3/2019 | Eriksson | G06T 5/008 |
| 2019/0164261 | A1* | 5/2019 | Sunkavalli | G06T 5/007 |
| 2019/0228510 | A1* | 7/2019 | Hwang | H04N 9/646 |
| 2019/0304072 | A1* | 10/2019 | Wong | G06T 5/40 |

OTHER PUBLICATIONS

Hirao, Katsuhiko, "Deep Neural Networks" The Institute of Electronics, Information and Communication Engineers, IEICE Technical Report, vol. 116, No. 496, pp. 37-42, Feb. 27, 2017.
International Preliminary Report on Patentability and Written Opinion for corresponding PCT Application No. PCT/JP2018/022259, 13 pages, dated Dec. 24, 2020.

* cited by examiner

LEARNING DEVICE, IMAGE GENERATION DEVICE, LEARNING METHOD, IMAGE GENERATION METHOD, AND PROGRAM

TECHNICAL FIELD

The present invention relates to a learning device, an image generation device, a learning method, an image generation method, and a program.

BACKGROUND ART

Techniques for IBL (Image-Based Lighting) are known for generating, using a light source that is set on the basis of a live-action image, a real CG (Computer-Graphics) image and a composite image of the CG image and the live-action image.

In order to enhance the reality of the generated image, it is desirable in the IBL that the light source is set on the basis of a wide angle-of-view image such as an HDR (High Dynamic-Range) 360-degree image. In order to obtain such a wide angle-of-view image, however, shooting with dedicated equipment such as a whole-sky camera or a half-sky camera is necessary, and further, specialized knowledge is required.

Thus, instead of generation of such a wide angle-of-view image by means of the shooting, generation of the wide angle-of-view image using an image generation unit implemented by a learned machine learning model or the like is carried out. In this case, in response to inputting an image shot by a commonly-used camera into the image generation unit, a wide angle-of-view image is generated in which estimation results for environments outside the angle of view of the relevant image, such as objects, scenes, and the like outside the angle of view of the relevant image, are supplemented.

SUMMARY

Technical Problems

Such a related-art technique for generating the wide angle-of-view image in such a manner as described above, however, is not capable of appropriately estimating a high luminance portion, and thus, a situation in which the high luminance portion is disposed at an unnatural position in the wide angle-of-view image or a situation in which, adversely, the high luminance portion is not disposed at a position where it is to be disposed has occurred, in some cases. As a result, a situation has occurred in which, for example, the setting of the light source in the IBL is unnatural, in some cases.

The present invention has been made in view of the above problem, and one of its objects is to provide a learning device, an image generation device, a learning method, an image generation method, and a program that are capable of enhancing the accuracy of estimation of a high luminance portion in a generated wide angle-of-view image.

Solution to Problems

In order to solve the above problems, a learning device according to the present invention includes an input image acquisition section that acquires an input image, a wide angle-of-view image generation section that, in response to an input of the input image, generates a generated wide angle-of-view image that is an image having a wider angle of view than the input image, a comparative wide angle-of-view image acquisition section that acquires a comparative wide angle-of-view image that is an image to be compared with the generated wide angle-of-view image, and a wide angle-of-view image generation learning section that performs learning for the wide angle-of-view image generation section by, on the basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

In one aspect of the present invention, the learning device further includes an HDR image generation section that, in response to an input of a standard dynamic-range image, generates a generated HDR image that is a high dynamic-range image, a comparative HDR image acquisition section that acquires a comparative HDR image that is a high dynamic-range image to be compared with the generated HDR image, and an HDR image generation learning section that performs learning for the HDR image generation section by updating parameter values of the HDR image generation section on the basis of a comparison result between the generated HDR image and the comparative HDR image, in which the input image acquisition section acquires, as the input image, the generated HDR image generated by the learned HDR image generation section.

Further, an image generation device according to the present invention includes an image acquisition section that acquires a standard dynamic-range image, an HDR image generation section that, in response to an input of the standard dynamic-range image, generates a high dynamic-range image, and a wide angle-of-view image generation section that, in response to an input of the high dynamic-range image, generates a wide angle-of-view image having a wider angle of view than the high dynamic-range image.

In one aspect of the present invention, the wide angle-of-view image generation section is a learned machine learning model, learning being performed by updating parameter values of the wide angle-of-view image generation section on the basis of a comparison result between a generated wide angle-of-view image that the wide angle-of-view image generation section generates in response to an input of an input image, and a comparative wide angle-of-view image to be compared with the generated wide angle-of-view image.

In this aspect, the wide angle-of-view image generation section may be a learned machine learning model, learning being performed by updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

Further, in one aspect of the present invention, the HDR image generation section is a learned machine learning model, learning being performed by updating parameter values of the HDR image generation section on the basis of a comparison result between the high dynamic-range image, which the HDR image generation section generates in response to the input of the standard dynamic-range image, and a high dynamic-range image to be compared with the high dynamic-range image.

Further, a learning method according to the present invention includes a step of acquiring an input image, a step of generating, in response to an input of the input image, using a wide angle-of-view image generation section, a generated wide angle-of-view image that is an image having a wider angle of view than the input image, a step of acquiring a comparative wide angle-of-view image that is an image to be compared with the generated wide angle-of-view image, and a step of performing learning for the wide angle-of-view image generation section by, on the basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

Further, an image generation method according to the present invention includes a step of acquiring a standard dynamic-range image, a step of generating, in response to an input of the standard dynamic-range image, a high dynamic-range image, and a step of generating, in response to an input of the high dynamic-range image, a wide angle-of-view image having a wider angle of view than the high dynamic-range image.

Further, a program according to the present invention causes a computer to execute a procedure of acquiring an input image, a procedure of generating, in response to an input of the input image, using a wide angle-of-view image generation section, a generated wide angle-of-view image that is an image having a wider angle of view than the input image, a procedure of acquiring a comparative wide angle-of-view image that is an image to be compared with the generated wide angle-of-view image, and a procedure of performing learning for the wide angle-of-view image generation section by, on the basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

Further, another program according to the invention causes a computer to execute a procedure of acquiring a standard dynamic-range image, a procedure of generating, in response to an input of the standard dynamic-range image, a high dynamic-range image, and a procedure of generating, in response to an input of the high dynamic-range image, a wide angle-of-view image having a wider angle of view than the high dynamic-range image.

DESCRIPTION OF EMBODIMENTS

Hereinafter, an embodiment of the present invention will be described in detail on the basis of the drawings.

Figure 1:
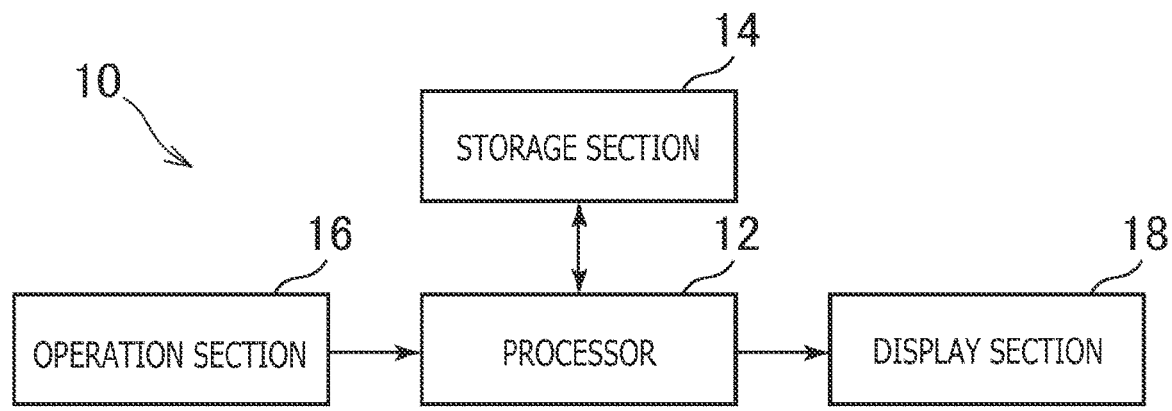
FIG. 1 is a configuration diagram of an image processing device according to an embodiment of the present invention.

FIG. 1 is a configuration diagram of an image processing device 10 according to the present embodiment. The image processing device 10 according to the present embodiment is a computer such as a game console, a personal computer, or the like. As illustrated in FIG. 1, the image processing device 10 according to the present embodiment includes, for example, a processor 12, a storage section 14, an operation section 16, and a display section 18.

The processor 12 is a program control device such as a CPU (Central Processing Unit) that operates following, for example, a program installed in the image processing device 10.

The storage section 14 is a storage element such as a ROM (Read-Only Memory), a RAM (Random Access Memory), a hard disc drive, or the like. The storage section 14 stores a program or the like executed by the processor 12.

The operation section 16 is a user interface including a keyboard, a mouse device, a controller for a game console, or the like, and upon receipt of an operation input by a user, outputs a signal indicating contents of the operation input to the processor 12.

The display section 18 is a display device such as a liquid crystal display and displays various images in accordance with instructions from the processor 12.

Note that the image processing device 10 may include a communication interface such as a network board, an optical disc drive for reading an optical disc such as a DVD (Digital Versatile Disc)-ROM, or a Blu-ray (registered trademark) disc, and a USB (Universal Serial Bus) port.

The image processing device 10 according to the present embodiment implements a learned machine learning model. Further, using the machine learning model, an image is generated in which, on the basis of a plane image (two-dimensional image), objects and scenes outside the angle of view of the plane image are supplemented. Here, an HDR (High Dynamic-Range) image employing 32 bits per channel may be generated on the basis of, for example, an SDR (Standard Dynamic-Range) plane image (two-dimensional image) employing 8 bits per channel. Further, the SDR plane image may be, for example, an image shot by a commonly-used camera. Further, the generated HDR image may be, for example, a whole-sky image (360-degree image), a half-sky image (180-degree image), or the like. Further, the generated HDR image may be a panoramic image.

Hereinafter, an example of the machine learning model implemented in the image processing device 10 will be described.

Figure 2:
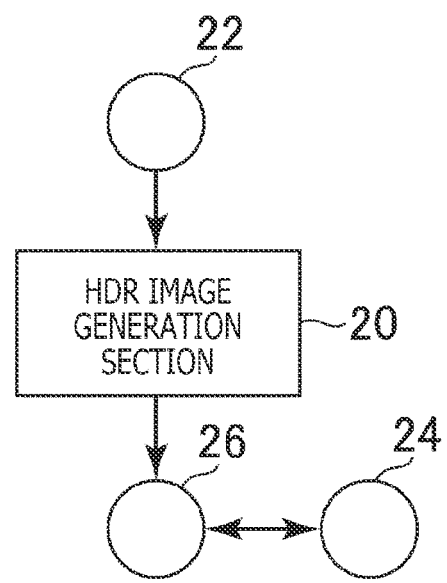
FIG. 2 is a diagram illustrating an example of first learning according to an embodiment of the present invention.

In learning for the machine learning model implemented in the image processing device 10 according to the present embodiment, first, learning for an HDR image generation section 20 is performed, as illustrated in FIG. 2. Here, learning data to be used in the learning for the HDR image generation section 20 will be referred to as first learning data. Further, hereinafter, the learning for the HDR image generation section 20 will be referred to as first learning.

The HDR image generation section 20 is, for example, a machine learning model implemented by a CNN (Convolutional Neural Network). In response to an input of, for example, an SDR image employing 8 bits per channel, the HDR image generation section 20 generates and outputs an HDR image associated with the SDR image and employing 32 bits per channel.

The first learning data includes, for example, a combination of a learning input SDR image 22 and a comparative HDR image 24.

The learning input SDR image 22 included in the first learning data is, for example, an image that is input to the HDR image generation section 20 in the first learning. The learning input SDR image 22 is, for example, an SDR plane image such as an image shot by a commonly-used camera.

The comparative HDR image 24 included in the first learning data is, for example, an HDR plane image such as an image that is not generated by the HDR image generation section 20 but is shot by a commonly-used camera, or the like.

In the present embodiment, for example, the learning input SDR image 22 is input to the HDR image generation section 20. Then, in response to the input of the learning input SDR image 22, the HDR image generation section 20 generates and outputs an HDR plane image associated with the learning input SDR image 22. The image generated in this manner will be referred to as a generated HDR image 26.

Further, in the present embodiment, for example, an error (comparison result) between the generated HDR image 26, which is an output at the time when the learning input SDR image 22 included in the first learning data is input to the HDR image generation section 20, and a comparative HDR image 24 included in the first learning data is specified. Here, for example, an inter-pixel error such as an L1 loss may be specified. Further, on the basis of the specified error, parameter values of the HDR image generation section 20 are updated by means of, for example, an error backpropagation method.

Figure 3:
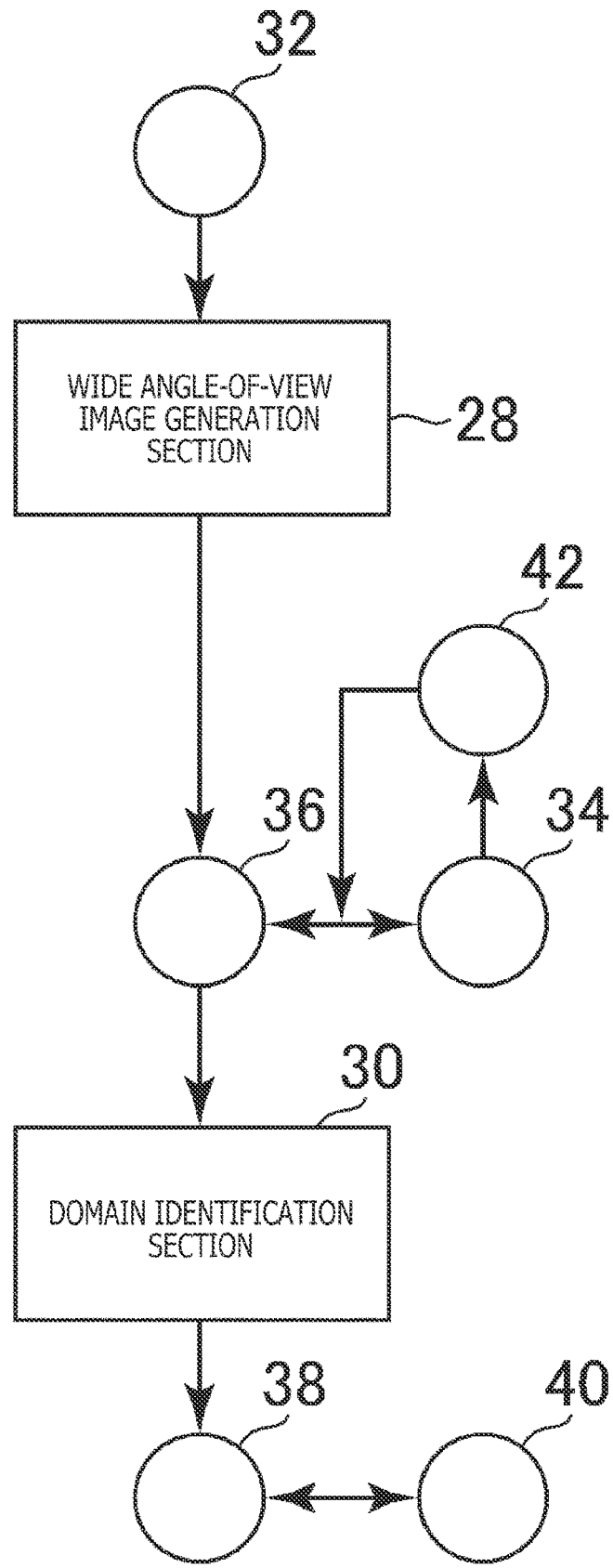
FIG. 3 is a diagram illustrating an example of second learning according to an embodiment of the present invention.

In the present embodiment, for example, separately from the aforementioned first learning, learning for a wide angle-of-view image generation section 28 is performed, as illustrated in FIG. 3. Here, learning data to be used in the learning for the wide angle-of-view image generation section 28 will be referred to as second learning data. Further, hereinafter, the learning for the wide angle-of-view image generation section 28 will be referred to as second learning.

Hereinafter, an example of the second learning, in which, using conditional GAN (Generative Adversarial Network) technology, not only the learning for the wide angle-of-view image generation section 28 is performed, but also learning for a domain identification section 30 is performed in conjunction therewith, will be described.

The wide angle-of-view image generation section 28 is, for example, a machine learning model implemented by the CNN. For example, an HDR plane image is input to the wide angle-of-view image generation section 28.

Further, the wide angle-of-view image generation section 28, for example, estimates environments outside the angle of view of the input HDR plane image, such as objects and scenes outside the angle of view of the image. Then, the wide angle-of-view image generation section 28, for example, generates an image on which the result of the estimation is reflected and which has a wider angle of view than any image included in the input plane image. Here, for example, a whole-sky image or a half-sky image may be generated. Further, for example, a panoramic image may be generated. Further, the wide angle-of-view image generation section 28 outputs a generated image.

The domain identification section 30 is, for example, a machine learning model implemented by the CNN. For example, either the image generated by the wide angle-of-view image generation section 28 or an image different from the image generated by the wide angle-of-view image generation section 28 is input to the domain identification section 30. Then, the domain identification section 30 outputs, for example, an identification result indicating whether or not an image having been input to the domain identification section 30 is the image having been generated by the wide angle-of-view image generation section 28. Here, the domain identification section 30 may output data indicating a degree of possibility that the image having been input to the domain identification section 30 is the image having been generated by the wide angle-of-view image generation section 28.

The second learning data includes a learning input HDR image 32 and a comparative wide angle-of-view image 34.

Figure 4:
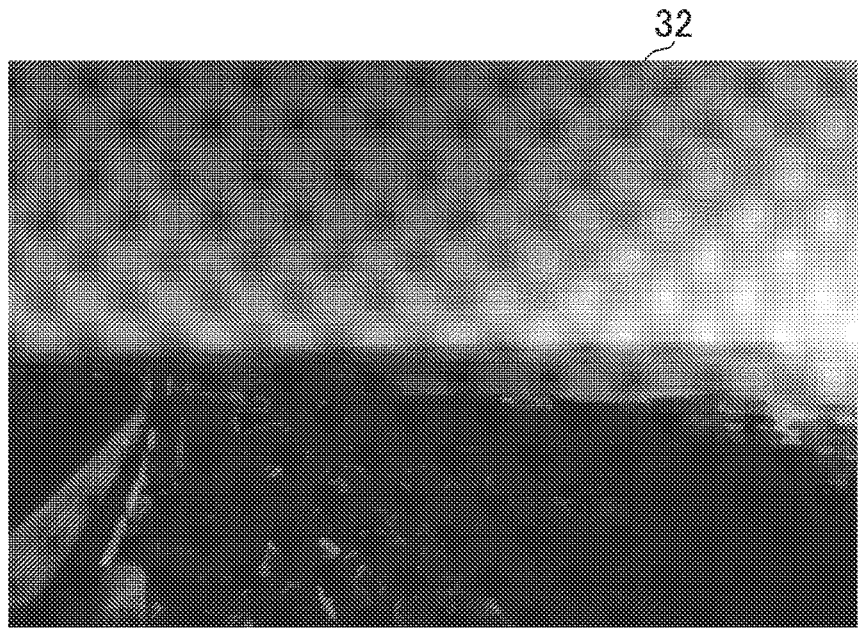
FIG. 4 is a diagram schematically illustrating an example of a learning input HDR image.

The learning input HDR image 32 included in the second learning data is, for example, an HDR plane image such as an image shot by a commonly-used camera. FIG. 4 is a diagram schematically illustrating an example of the learning input HDR image 32 according to the present embodiment. Here, FIG. 4 illustrates an image resulting from binarization processing on the HDR image. Note that, as the learning input HDR image 32, an HDR plane image generated by the learned HDR image generation section 20 may be used. Here, for example, an HDR plane image that the learned HDR image generation section 20 generates in response to the input of the learning input SDR image 22 may be used as the learning input HDR image 32. Further, an HDR plane image that the learned HDR image generation section 20 generates in response to the input of an SDR image different from the learning input SDR image 22 may be used as the learning input HDR image 32.

Figure 5:
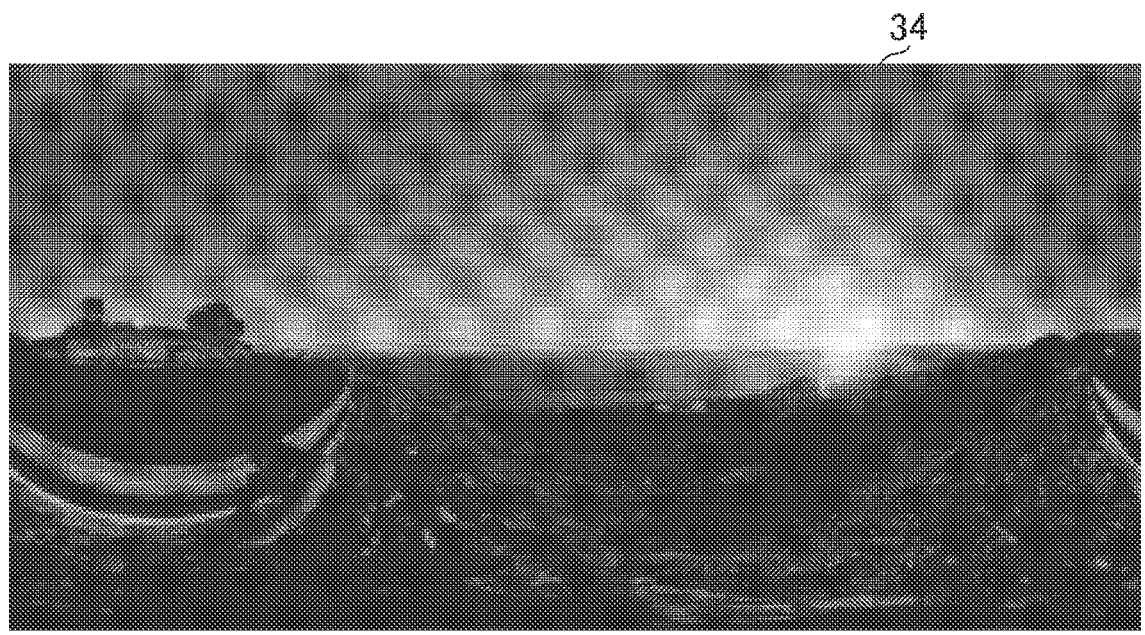
FIG. 5 is a diagram schematically illustrating an example of a comparative wide angle-of-view image.

The comparative wide angle-of-view image 34 included in the second learning data is, for example, an HDR wide angle-of-view image that is not the image having been generated by the wide angle-of-view image generation section 28 but is a whole-sky image having been shot by a whole-sky camera, a half-sky image having been shot by a half-sky camera, or the like. In addition, the comparative wide angle-of-view image 34 may be a panoramic image having been shot by a panoramic camera. FIG. 5 is a diagram schematically illustrating an example of the comparative wide angle-of-view image 34 according to the present embodiment. Here, FIG. 5 illustrates an image resulting from binarization processing on the HDR image.

Further, as the comparative wide angle-of-view image 34 included in the second learning data, an image associated with the learning input HDR image 32 included in the second learning data may be used. The comparative wide angle-of-view image 34 included in the second learning data may be, for example, an image having been shot at the same position as that for the learning input HDR image 32 included in the second learning data.

Figure 6:
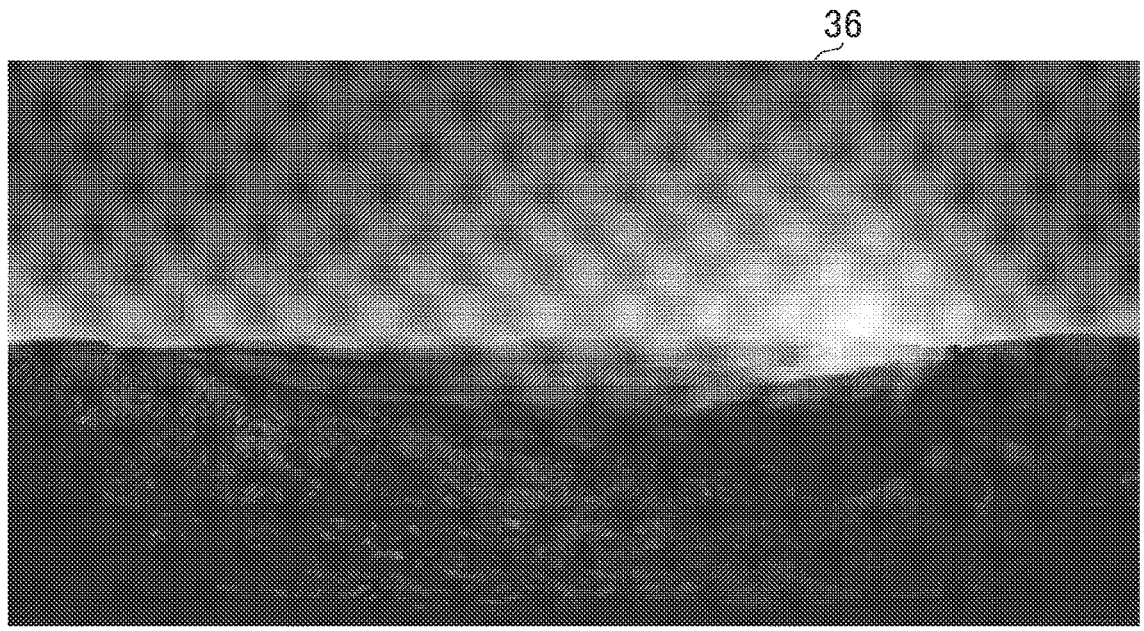
FIG. 6 is a diagram schematically illustrating an example of a generated wide angle-of-view image.

In the second learning, the learning input HDR image 32 included in the second learning data is input to the wide angle-of-view image generation section 28. Then, in response to the input of the learning input HDR image 32, the wide angle-of-view image generation section 28 generates an image having a wider angle of view than the learning input HDR image 32. The image generated in this manner will be referred to as a generated wide angle-of-view image 36. FIG. 6 is a diagram schematically illustrating an example of the generated wide angle-of-view image 36 according to the present embodiment. Here, FIG. 6 illustrates an image resulting from binarization processing on the HDR image.

Further, either the generated wide angle-of-view image 36 having been generated on the basis of the learning input HDR image 32 included in the second learning data or the comparative wide angle-of-view image 34 included in the second learning data is input to the domain identification section 30.

Further, the domain identification section 30 outputs, for example, generation possibility data 38 indicating a degree of possibility that the image having been input to the domain identification section 30 is the generated wide angle-of-view image 36. Then, an adversarial loss is specified, which is an error (comparison result) between the generation possibility data 38 and domain identification data 40 indicating which of the generated wide angle-of-view image 36 and the comparative wide angle-of-view image 34 the image having been input to the domain identification section 30 is.

Here, as the value of the domain identification data 40, for example, a value associated with either the generated wide angle-of-view image 36 or the comparative wide angle-of-view image 34 may be set.

For example, the generation possibility data 38 may be data taking a value larger than or equal to 0 and smaller than or equal to 1. In this case, the domain identification data 40 may be, for example, data that takes 1 as its value in a case where the image having been input to the domain identification section 30 is the generated wide angle-of-view image 36 and that takes 0 as its value in a case where the image having been input to the domain identification section 30 is the comparative wide angle-of-view image 34.

Further, the generation possibility data 38 and the domain identification data 40 may be each expressed as a vector including, for example, two elements. For example, the value of a first element of the generation possibility data 38 may be a value indicating a degree of possibility that the image having been input to the domain identification section 30 is the generated wide angle-of-view image 36. Further, the value of a second element of the generation possibility data 38 may be a value indicating a degree of possibility that the image having been input to the domain identification section 30 is the comparative wide angle-of-view image 34. In this case, a value of the domain identification data 40, associated with the generated wide angle-of-view image 36 may be expressed by a two-dimensional vector (1,0), and a value of the domain identification data 40, associated with the comparative wide angle-of-view image 34 may be expressed by a two-dimensional vector (0,1).

Further, in the present embodiment, parameter values of either the wide angle-of-view image generation section 28 or the domain identification section 30 are updated on the basis of the adversarial loss by means of, for example, the error backpropagation method.

Here, in the second learning according to the present embodiment, the updates of the parameter values of the wide angle-of-view image generation section 28 using a predetermined number of sets of second learning data and the updates of the parameter values of the domain identification section 30 using a predetermined number of sets of second learning data may be alternately and repeatedly made. In this case, when the update of the parameter values of the wide angle-of-view image generation section 28 is made, the parameter values of the wide angle-of-view image generation section 28 are updated in a state in which the parameter values of the domain identification section 30 are fixed. Further, when the update of the parameter values of the domain identification section 30 is made, the parameter values of the domain identification section 30 are updated in a state in which the parameter values of the wide angle-of-view image generation section 28 are fixed.

Further, as described above, the second learning according to the present embodiment is performed using the conditional GAN technology. Thus, in the update of the parameter values of the wide angle-of-view image generation section 28, not only the adversarial loss is used, but also the inter-pixel error, such as the L1 loss or the like, between the generated wide angle-of-view image 36 and the comparative wide angle-of-view image 34 is additionally used.

Further, in the present embodiment, for example, for each pixel, a weight 42 according to the magnitude of a luminance value in the comparative wide angle-of-view image 34 is determined. Further, a corrected inter-pixel error is determined by performing weighting of the aforementioned inter-pixel error using the weight 42. For example, for each pixel, the value of the corrected inter-pixel error is determined by multiplying the value of the inter-pixel error by the value indicating the weight 42. Further, on the basis of the adversarial loss and the corrected inter-pixel error which is determined for each pixel, the parameter values of the wide angle-of-view image generation section 28 are updated by means of, for example, the error backpropagation method.

Figure 7:
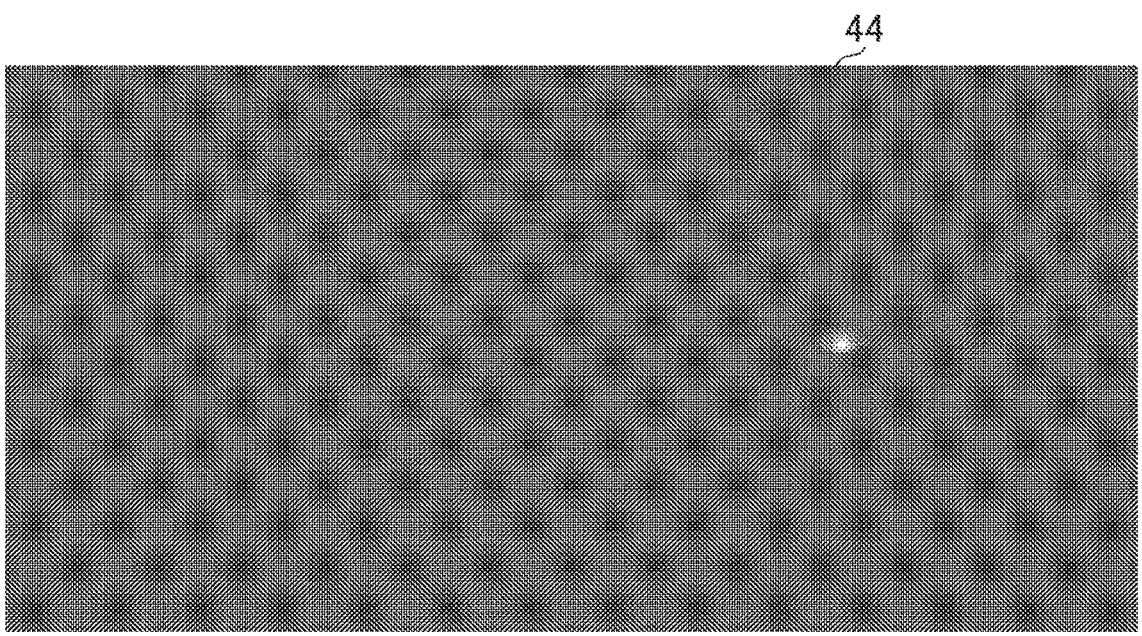
FIG. 7 is a diagram illustrating an example of a weight map.

FIG. 7 is a diagram illustrating an example of a weight map 44 according to the present embodiment, in which an example of weights 42 according to luminance values is depicted. In the weight map 44 of FIG. 7, the larger a value indicating the weight 42 of a pixel is, the more whitish tone the pixel is depicted in, whereas the smaller the value indicating the weight 42 of a pixel is, the more blackish tone the pixel is depicted in. Here, FIG. 7 illustrates an image resulting from binarization processing.

Here, the weight 42 may be expressed by, for example, an increasing function of the luminance value. For example, the weight 42 of each pixel may be set such that, in a case where the luminance value is smaller than a predetermined value, the weight 42 is set to 1, whereas in a case where the luminance value is larger than or equal to the predetermined value, the larger the luminance value is, the larger the weight 42 is. Further, for example, the weight 42 of each pixel may be set such that, in a case where the luminance value is smaller than a predetermined value, the weight 42 is set to 1, whereas in a case where the luminance value is larger than or equal to the predetermined value, the weight 42 is set to 2. Note that the relation between the luminance value and the weight 42 is not limited to the above-described relation.

In the present embodiment, the learning for the wide angle-of-view image generation section 28 is performed in such a manner as described above, by updating the parameter values of the wide angle-of-view image generation section 28 such that, according to the luminance levels of pixels in the comparative wide angle-of-view image 34, the update amounts of the parameter values concerning the relevant pixels are increased.

Note that, for each pixel, the weight 42 according to the magnitude of a luminance value not in the comparative wide angle-of-view image 34 but in the generated wide angle-of-view image 36 may be determined. In this case, the learning for the wide angle-of-view image generation section 28 is performed by updating the parameter values of the wide angle-of-view image generation section 28 such that, according to the luminance levels of pixels in the generated wide angle-of-view image 36, the update amounts of the parameter values concerning the relevant pixels are increased.

Further, for each pixel, the weight 42 according to the magnitude of a larger one of the luminance value of the relevant pixel in the comparative wide angle-of-view image 34 and the luminance value of the relevant pixel in the generated wide angle-of-view image 36 may be determined. In this case, the parameter values of the wide angle-of-view image generation section 28 are updated such that, according to the luminance levels of pixels in the comparative wide angle-of-view image 34 or the luminance levels of pixels in the generated wide angle-of-view image 36, the update amounts of the parameter values concerning the relevant pixels are increased.

Note that learning methods according to the present embodiment are not limited to the above-described learning methods. For example, the second learning may be performed not using, for example, the conditional GAN technology, but on the basis of, for example, only the inter-pixel error and the corrected inter-pixel error. In this case, as a result, the learning for the wide angle-of-view image generation section 28 is performed not using the domain identification section 30.

Figure 8:
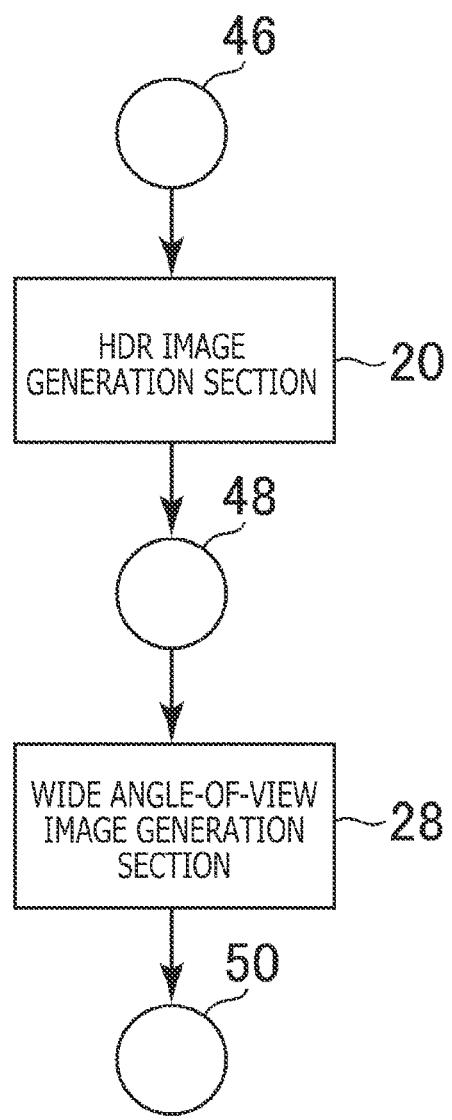
FIG. 8 is a diagram illustrating an example of an image generation according to an embodiment of the present invention.

Hereinafter, generation of an image using the learned HDR image generation section 20 and the learned wide angle-of-view image generation section 28 will be described referring to FIG. 8.

First, an SDR plane image such as an image shot by a commonly-used camera, or the like is input to the learned HDR image generation section 20. Hereinafter, the image that is input in this manner will be referred to as a target input image 46.

Then, the HDR image generation section 20 generates and outputs an HDR plane image according to the target input image 46. Hereinafter, the HDR image that is output in this manner will be referred to as a target intermediate image 48.

Further, the target intermediate image 48 is input to the learned wide angle-of-view image generation section 28. Then, the wide angle-of-view image generation section 28 generates and outputs an HDR image according to the target intermediate image 48. The image that is output here is an image in which, for example, objects and scenes outside the angle of view of the target intermediate image 48 are supplemented and which has a wider angle of view than the target intermediate image 48. Hereinafter, the relevant image will be referred to as a target wide angle-of-view image 50.

Pixels having a high luminance, such as pixels having a large luminance value are highly likely to be pixels by which what is called a light source such as the sun or an illumination lamp is depicted. Further, in a case where estimation of such high luminance pixels by the wide angle-of-view image generation section 28 is not appropriately made, a high luminance portion is disposed at an unnatural position in the generated wide angle-of-view image 36, or the high luminance portion is not disposed at the portion where it is to be disposed. As a result, for example, a situation in which the setting of a light source in the IBL is unnatural has occurred, in some cases.

In the present embodiment, as described above, the learning for the wide angle-of-view image generation section 28 is performed by updating the parameter values of the wide angle-of-view image generation section 28 such that, according to the luminance levels of pixels, the update amounts of the parameter values concerning the relevant pixels are increased. This configuration, therefore, makes it possible to enhance accuracy of estimation of the high luminance pixels by the wide angle-of-view image generation section 28. Consequently, the above configuration enables the setting of the light source in the IBL to be natural, for example. Further, the above configuration makes it possible to delicately depict, for example, reflection of a specular object using the techniques for the IBL.

Here, the learning for the wide angle-of-view image generation section 28 may be performed by, for example, updating the parameter values of the wide angle-of-view image generation section 28 such that, according to the luminance levels of pixels in the comparative wide angle-of-view image 34, the update amounts of the parameter values concerning the relevant pixels are increased. In this case, the possibility that the high luminance portion is not disposed at the portion where it is to be disposed in the generated wide angle-of-view image 36 can be decreased.

Further, the learning for the wide angle-of-view image generation section 28 may be performed by, for example, updating the parameter values of the wide angle-of-view image generation section 28 such that, according to the luminance levels of pixels in the generated wide angle-of-view image 36, the update amounts of the parameter values concerning the relevant pixels are increased. In this case, the possibility that the high luminance portion is disposed at an unnatural position in the generated wide angle-of-view image 36 can be decreased.

Further, in the present embodiment, the weight 42 of each pixel according to its luminance value is determined on the basis of an HDR image having a wide dynamic range, and thus, this configuration makes it possible to perform accurate weighting according to a luminance, such as weighting that allows a particularly large weight 42 to be given to a particularly high luminance portion, or the like.

Further, in a case where the conditional GAN technology is used in the second learning, an HDR image generated by the wide angle-of-view image generation section 28 can be made an image of a high frequency.

Further, in the present embodiment, as described above, for example, the learning for the HDR image generation section 20 is performed separately from the learning for the wide angle-of-view image generation section 28. Further, the generation of an HDR image, based on an SDR image is made by the HDR image generation section 20, and the generation of an HDR wide angle-of-view image, based on the relevant HDR image is made by the wide angle-of-view image generation section 28. In this manner, the generation of an HDR wide angle-of-view image is made in two stages, and thus, as a result, according to the present embodiment, an HDR wide angle-of-view image having high contrast is generated.

Note that a light source in the IBL (Image-Based Lighting) may be set on the basis of the target wide angle-of-view image 50 generated by the image processing device 10 according to the present embodiment. Note that it is a matter of course that the use of the target wide angle-of-view image 50 generated by the image processing device 10 according to the present embodiment is not limited to the IBL.

Hereinafter, the functions of the image processing device 10 according to the present embodiment and the processes performed by the image processing device 10 will be further described.

Figure 9:
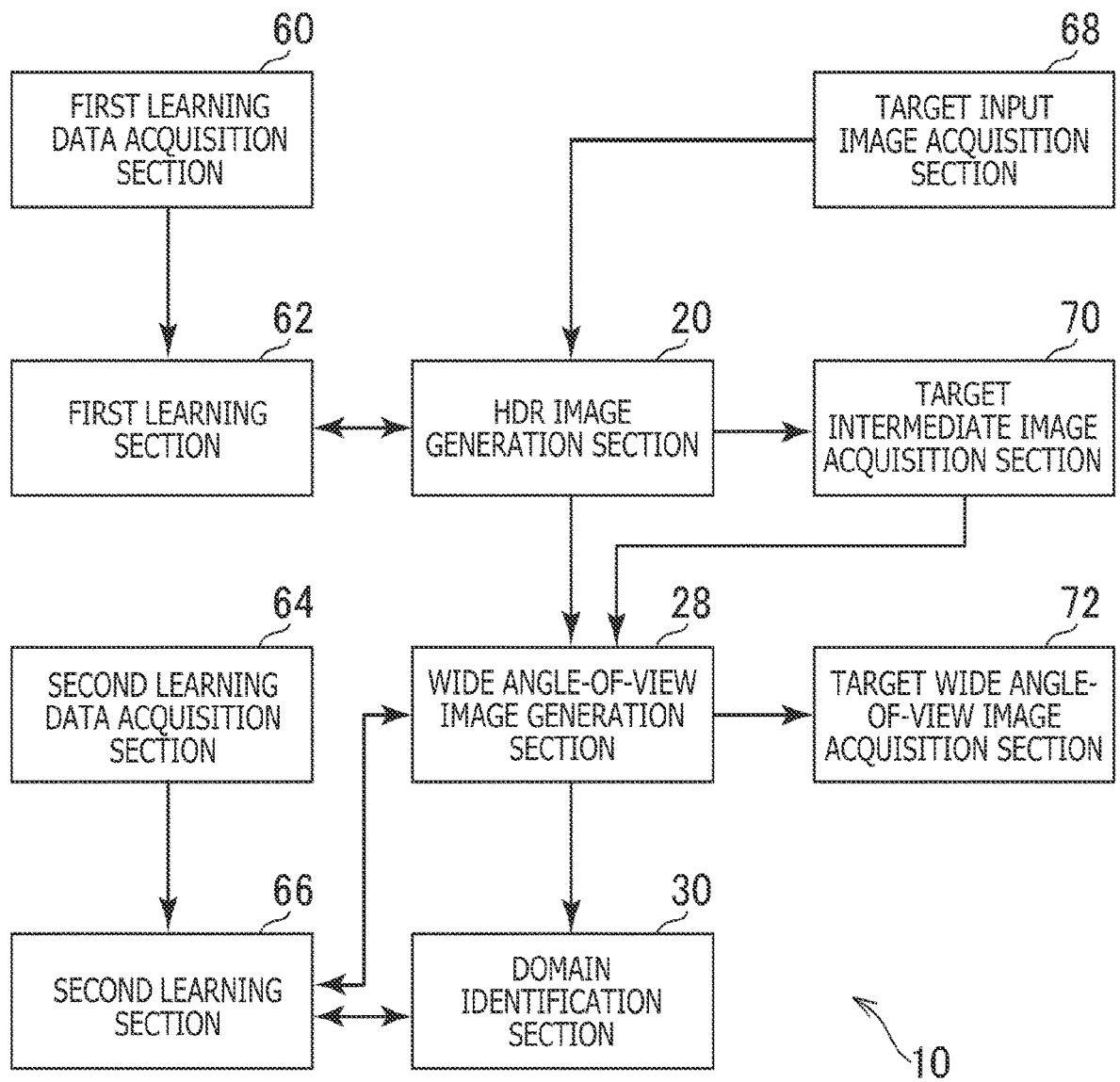
FIG. 9 is a functional block diagram illustrating an example of functions implemented by an image processing device according to an embodiment of the present invention.

FIG. 9 is a functional block diagram illustrating an example of functions implemented by the image processing device 10 according to the present embodiment. Note that, in the image processing device 10 according to the present embodiment, all of functions illustrated in FIG. 9 are not necessarily implemented, and one or more functions other than the functions illustrated in FIG. 9 may be implemented.

As illustrated in FIG. 9, the image processing device 10 according to the present embodiment functionally includes, for example, the HDR image generation section 20, the wide angle-of-view image generation section 28, the domain identification section 30, a first learning data acquisition section 60, a first learning section 62, a second learning data acquisition section 64, a second learning section 66, a target input image acquisition section 68, a target intermediate image acquisition section 70, and a target wide angle-of-view image acquisition section 72. The above elements are implemented mainly as the processor 12 and the storage section 14.

The image processing device 10 according to the present embodiment plays a role as a learning device for performing learning for a machine learning model implemented in the image processing device 10 as well as a role as an image generation device for making an image generation using the learned machine learning model. In the example of FIG. 9, the HDR image generation section 20, the wide angle-of-view image generation section 28, the domain identification section 30, the first learning data acquisition section 60, the first learning section 62, the second learning data acquisition section 64, and the second learning section 66 correspond to the roll as the learning device. Further, the HDR image generation section 20, the wide angle-of-view image generation section 28, the target input image acquisition section 68, the target intermediate image acquisition section 70, and the target wide angle-of-view image acquisition section 72 correspond to the role as the image generation device.

The above functions may be implemented by allowing the processor 12 to execute a program installed in the image processing device 10, which is a computer, and including instructions corresponding to the above functions. This program may be supplied to the image processing device 10 via a computer-readable information storage medium such as an optical disc, a magnetic disk, a magnetic tape, a magneto-optical disk, or a flash memory, or via the Internet or the like.

As described above, in the present embodiment, the HDR image generation section 20, for example, generates and outputs an HDR plane image in response to the input of an SDR plane image. Further, the HDR image generation section 20 may be implemented by a machine learning model such as the CNN.

As described above, in the present embodiment, the wide angle-of-view image generation section 28, for example, generates, in response to an input of an image, an image having a wider angle of view than the relevant image. Further, as described above, in the present embodiment, the wide angle-of-view image generation section 28, for example, outputs a generated image, and further may output an HDR image in response to an input of an HDR image. Further, the wide angle-of-view image generation section 28 may be implemented by a machine learning model such as the CNN.

As described above, in the present embodiment, the domain identification section 30, for example, outputs an identification result indicating whether or not an image having been input to the domain identification section 30 is an image having been generated by the wide angle-of-view image generation section 28. Further, the domain identification section 30 may be implemented by a machine learning model such as the CNN or the like.

In the present embodiment, the first learning data acquisition section 60, for example, acquires the first learning data including a combination of the learning input SDR image 22 and the comparative HDR image 24.

In the present embodiment, the first learning section 62, for example, performs the first learning using the first learning data acquired by the first learning data acquisition section 60. Here, for example, on the basis of the learning input SDR image 22 included in the first learning data, the generated HDR image 26 may be generated by the HDR image generation section 20. Further, learning for the HDR image generation section 20 may be performed by updating the parameter values of the HDR image generation section 20 on the basis of a comparison result between the generated HDR image 26 and the comparative HDR image 24 included in the first learning data.

In the present embodiment, the second learning data acquisition section 64, for example, acquires the second learning data including a combination of the learning input HDR image 32 and the comparative wide angle-of-view image 34. Here, the second learning data acquisition section 64 may acquire the second learning data including the generated HDR image 26, which is generated by the learned HDR image generation section 20, as the learning input HDR image 32.

In the present embodiment, the second learning section 66, for example, performs the second learning using the second learning data acquired by the second learning data acquisition section 64.

Here, for example, on the basis of the learning input HDR image 32 included in the second learning data, the generated wide angle-of-view image 36 may be generated by the wide angle-of-view image generation section 28. Further, for each pixel included in the generated wide angle-of-view image 36 or the comparative wide angle-of-view image 34 included in the second learning data, the weight 42 according to the luminance value of the pixel may be determined.

Further, the pixels included in the generated wide angle-of-view image 36 and the pixels included in the comparative wide angle-of-view image 34 may be associated with each other on a one-to-one basis. Further, for each pixel included in the comparative wide angle-of-view image 34, the weight 42 according to a larger one of the luminance value of the relevant pixel and the luminance value of a pixel associated with the relevant pixel and included in the generated wide angle-of-view image 36 may be determined as the weight 42 of the relevant pixel.

Further, learning for the wide angle-of-view image generation section 28 may be performed by updating the parameter values of the wide angle-of-view image generation section 28 so as to achieve update amounts according to the determined weights 42 and an inter-pixel error between the generated wide angle-of-view image 36 and the comparative wide angle-of-view image 34. For example, for a certain pixel, on the basis of the value of a corrected inter-pixel error, which is obtained by multiplying the value of an inter-pixel error between the generated wide angle-of-view image 36 and the comparative wide angle-of-view image 34 by the value indicating the weight 42 of the relevant pixel, the update amount of a parameter value concerning the relevant pixel may be determined.

Here, the learning for the wide angle-of-view image generation section 28 may be performed by, for example, updating the parameter values of the wide angle-of-view image generation section 28 such that, according to the luminance levels of pixels in the comparative wide angle-of-view image 34, the update amounts of the parameter values concerning the relevant pixels are increased.

Further, the learning for the wide angle-of-view image generation section 28 may be performed by, for example, updating the parameter values of the wide angle-of-view image generation section 28 such that, according to the luminance levels of pixels in the generated wide angle-of-view image 36, the update amounts of the parameter values concerning the relevant pixels are increased.

Further, the parameter values of the wide angle-of-view image generation section 28 may be updated such that, for example, according to the luminance levels of pixels in the comparative wide angle-of-view image 34 or the luminance levels of pixels in the generated wide angle-of-view image 36, the update amounts of the parameter values concerning the relevant pixels are increased.

In the present embodiment, the target input image acquisition section 68, for example, acquires the aforementioned target input image 46, which is input to the learned HDR image generation section 20.

In the present embodiment, the target intermediate image acquisition section 70, for example, acquires the target intermediate image 48, which, as described above, the HDR image generation section 20 generates and outputs on the basis of the target input image 46. Further, in the present embodiment, the target intermediate image acquisition section 70, for example, inputs the target intermediate image 48 to the wide angle-of-view image generation section 28.

In the present embodiment, the target wide angle-of-view image acquisition section 72, for example, acquires the target wide angle-of-view image 50, which, as described above, the wide angle-of-view image generation section 28 generates and outputs on the basis of the target intermediate image 48.

Here, an example of the flow of learning processes in the HDR image generation section 20, the wide angle-of-view image generation section 28, and the domain identification section 30, which are performed by the image processing device 10 according to the present embodiment, will be described referring to a flow chart illustrated as an example in FIG. 10.

First, the first learning data acquisition section 60 acquires a plurality of sets of first learning data (S101).

Then, the first learning section 62 performs the first learning using the plurality of sets of first learning data, which have been acquired in the process indicated in S101 (S102). Here, the learning for the HDR image generation section 20 is performed.

Further, the second learning data acquisition section 64 acquires a plurality of sets of second learning data (S103). Here, for example, (m×2n) sets of second learning data are assumed to be acquired (m and n each being an integer). The (m×2n) sets of second learning data are assumed to be separated into data groups each composed of 2n sets of second learning data. Hereinafter, a data group at i-th order will be referred to as an i-th data group (1≤i≤m).

Further, the second learning section 66 sets the value of the variable i to 1 (S104).

Then, the second learning section 66 performs the second learning for the wide angle-of-view image generation section 28 using n sets of second learning data included in the i-th data group (S105). In the process indicated in S105, the parameter values of the wide angle-of-view image generation section 28 are updated in a state in which the parameter values of the domain identification section 30 are fixed.

Then, the second learning section 66 performs the second learning for the domain identification section 30 using n remaining sets of second learning data that are included in the i-th data group and are not used in the process indicated in S105 (S106). In the process indicated in S106, the parameter values of the domain identification section 30 are updated in a state in which the parameter values of the wide angle-of-view image generation section 28 are fixed.

Further, the second learning section 66 confirms whether or not the value of the variable i is equal to m (S107). In a case where the value is not equal to m (S107: N), the second learning section 66 increments the value of the variable i by 1 (S108), and the flow returns to the process indicated in S105. In a case where the value is equal to m (S107: Y), the processes indicated in the present processing example end.

Next, an example of the flow of the process indicated in S105 described above, namely, of the second learning for the wide angle-of-view image generation section 28 using the n sets of second learning data included in the i-th data group, will be described referring to a flow chart illustrated as an example in FIG. 11.

First, the second learning section 66 acquires one set of second learning data for which the following processes indicated in S202 to S212 are not yet performed from among the n sets of second learning data included in the i-th data group (S201).

Then, the second learning section 66 specifies the comparative wide angle-of-view image 34 included in the set of second learning data, which has been acquired in the process indicated in S201 (S202).

Then, the second learning section 66 specifies the learning input HDR image 32 included in the set of second learning data, which has been acquired in the process indicated in S201 (S203).

Then, the second learning section 66 inputs the learning input HDR image 32, which has been specified in the process indicated in S203, in the wide angle-of-view image generation section 28 (S204).

Then, the second learning section 66 acquires the generated wide angle-of-view image 36, which is an output of the wide angle-of-view image generation section 28 at the time when the learning input HDR image 32 has been input thereto in the process indicated in S204 (S205).

Then, the second learning section 66 inputs either the comparative wide angle-of-view image 34, which has been specified in the process indicated in S202, or the generated wide angle-of-view image 36, which has been acquired in the process indicated in S205, to the domain identification section 30 (S206).

Then, the second learning section 66 acquires the generation possibility data 38, which is an output of the domain identification section 30 according to the input thereto in the process indicated in S206 (S207).

Then, the second learning section 66 calculates an adversary loss on the basis of the generation possibility data 38, which has been acquired in the process indicated in S207, and the domain identification data 40, which is associated with the input in the process indicated in S206 (S208).

Then, the second learning section 66 specifies an inter-pixel error between the comparative wide angle-of-view image 34, which has been specified in the process indicated in S202, and the generated wide angle-of-view image 36, which has been acquired in the process indicated in S205 (S209).

Then, the second learning section 66 determines the weights 42 associated with individual pixels included in the comparative wide angle-of-view image 34, which has been specified in the process indicated in S202 (S210). Here, for example, the weights 42 associated with the individual pixels included in the generated wide angle-of-view image 36, which has been acquired in the process indicated in S205, may be determined. Further, for example, for each one of the pixels, the weight 42 according to the magnitude of a larger one of the luminance value of the relevant pixel in the comparative wide angle-of-view image 34 or the luminance value of the relevant pixel in the generated wide angle-of-view image 36 may be determined.

Further, the second learning section 66 calculates corrected inter-pixel errors on the basis of the inter-pixel error, which has been specified in the process indicated in S209, and the weights 42, which have been determined in the process indicated in S210 (S211).

Then, the second learning section 66 updates the parameter values of the wide angle-of-view image generation section 28 on the basis of the adversarial loss, which has been calculated in the process indicated in S209, and the corrected inter-pixel errors, which have been calculated in the process indicated in S211 (S212). Here, as described above, the parameter values of the wide angle-of-view image generation section 28 are updated such that, according to the luminance levels of pixels in the comparative wide angle-of-view image 34, the update amounts of the parameter values concerning the relevant pixels are increased. Further, the parameter values of the wide angle-of-view image generation section 28 may be updated in a direction in which the adversarial loss is increased and in a direction in which the corrected inter-pixel errors are decreased, by means of, for example, the error backpropagation method.

Further, the second learning section 66 confirms whether or not the processes indicated in S202 to S212 have been performed on all of the n sets of second learning data included in the i-th data group (S213). In a case where the processes indicated in S202 to S212 have not yet been performed on all of the second learning data (S213: N), the flow returns to the process indicated in S201. In a case where the processes indicated in S202 to S212 have been performed on all of the second learning data (S213: Y), the process indicated in S105 ends.

Note that, during one loop of the processes indicated in S201 to S213, the processes indicated in S206 to S212 may be repeatedly performed twice for respective cases, namely, a case where the comparative wide angle-of-view image 34 is input to the domain identification section 30, and a case where the generated wide angle-of-view image 36 is input to the domain identification section 30.

Next, an example of the flow of the process indicated in S106 described above, namely, of the second learning for the domain identification section 30 using the n remaining sets of second learning data included in the i-th data group and not used in the process indicated in S105, will be described referring to a flow chart illustrated as an example in FIG. 12.

First, the second learning section 66 acquires one set of second learning data for which the following processes indicated in S302 to S312 are not yet performed from among the n remaining sets of second learning data included in the i-th data group and not used in the process indicated in S105 (S301).

Then, the second learning section 66 specifies the comparative wide angle-of-view image 34 included in the set of second learning data, which has been acquired in the process indicated in S301 (S302).

Further, the second learning section 66 specifies the learning input HDR image 32 included in the set of second learning data, which has been acquired in the process indicated in S301 (S303).

Then, the second learning section 66 inputs the learning input HDR image 32, which has been specified in the process indicated in S303, to the wide angle-of-view image generation section 28 (S304).

Then, the second learning section 66 acquires the generated wide angle-of-view image 36, which is the output of the wide angle-of-view image generation section 28 at the time when the learning input HDR image 32 has been input thereto in the process indicated in S304 (S305).

Then, the second learning section 66 inputs either the comparative wide angle-of-view image 34, which has been specified in the process indicated in S302, or the generated wide angle-of-view image 36, which has been acquired in the process indicated in S206, to the domain identification section 30 (S306).

Then, the second learning section 66 acquires the generation possibility data 38, which is the output of the domain identification section 30 according to the input thereto in the process indicated in S306 (S307).

Then, the second learning section 66 calculates an adversarial loss on the basis of the generation possibility data 38, which has been acquired in the process indicated in S307, and the domain identification data 44, which is associated with the input in the process indicated in S206 (S308).

Then, the second learning section 66 updates the parameter values of the domain identification section 30 on the basis of the adversarial loss, which has been calculated in the process indicated in S308 (S309). Here, the parameter values of the domain identification section 30 may be updated in a direction in which the adversarial loss is decreased, by means of, for example, the error backpropagation method.

Further, the second learning section 66 confirms whether or not the processes indicated in S302 to S309 have been performed on all of the n remaining sets of second learning data, which are included in the i-th data group and are not used in the process indicated in S105 (S310). In a case where the processes indicated in S302 to S309 have not yet been performed on all of the second learning data (S310: N), the flow returns to the process indicated in S301. In a case where the processes indicated in S302 to S309 have been performed on all of the second learning data (S310: Y), the process indicated in S106 ends.

Note that, during one loop of the processes indicated in S301 to S313, the processes indicated in S306 to S309 may be repeatedly performed twice for respective cases, namely, the case where the comparative wide angle-of-view image 34 is input to the domain identification section 30, and the case where the generated wide angle-of-view image 36 is input to the domain identification section 30.

Figure 10:
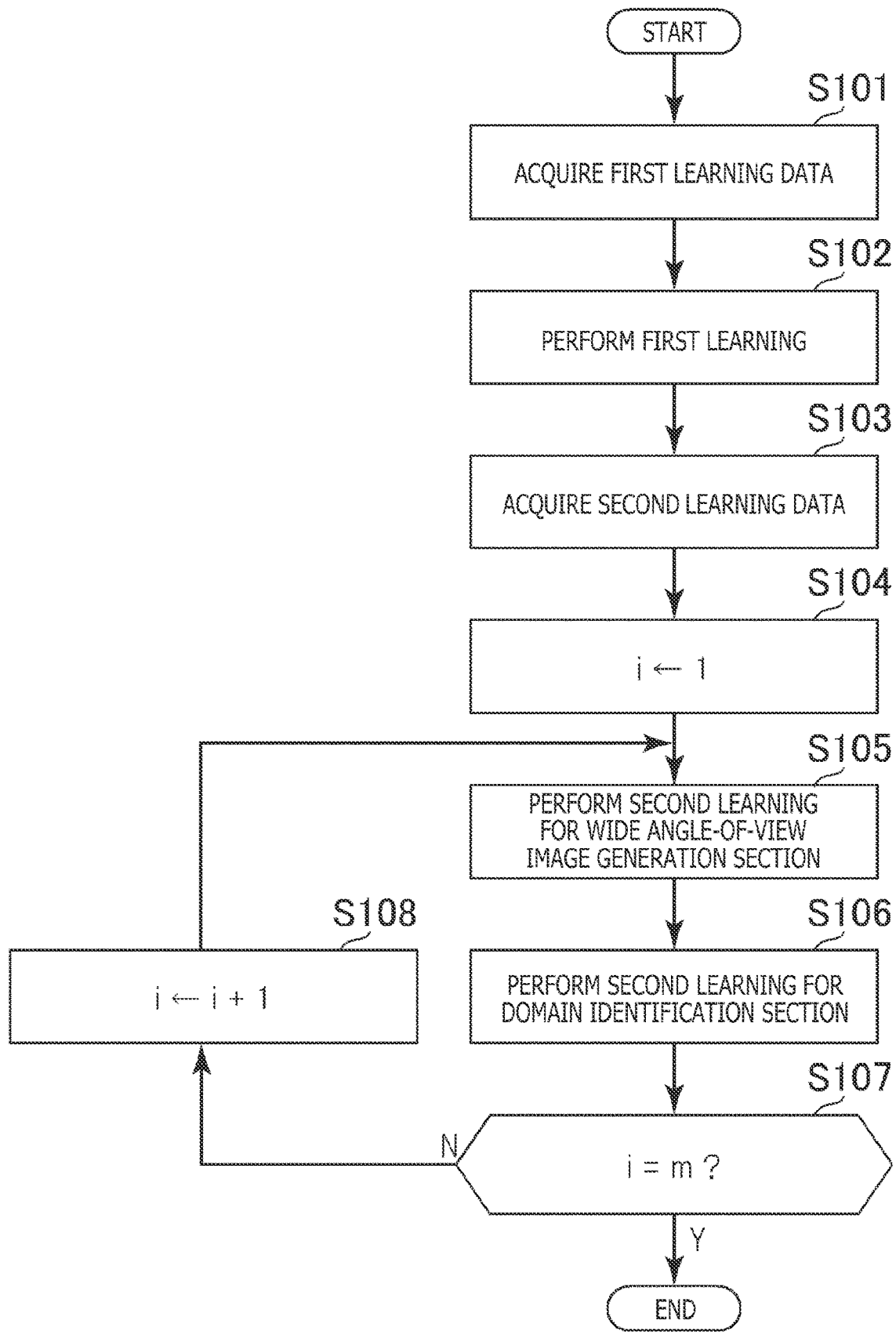
FIG. 10 is a flow chart illustrating an example of the flow of learning processing performed by an image processing device according to an embodiment of the present invention.
Figure 11:
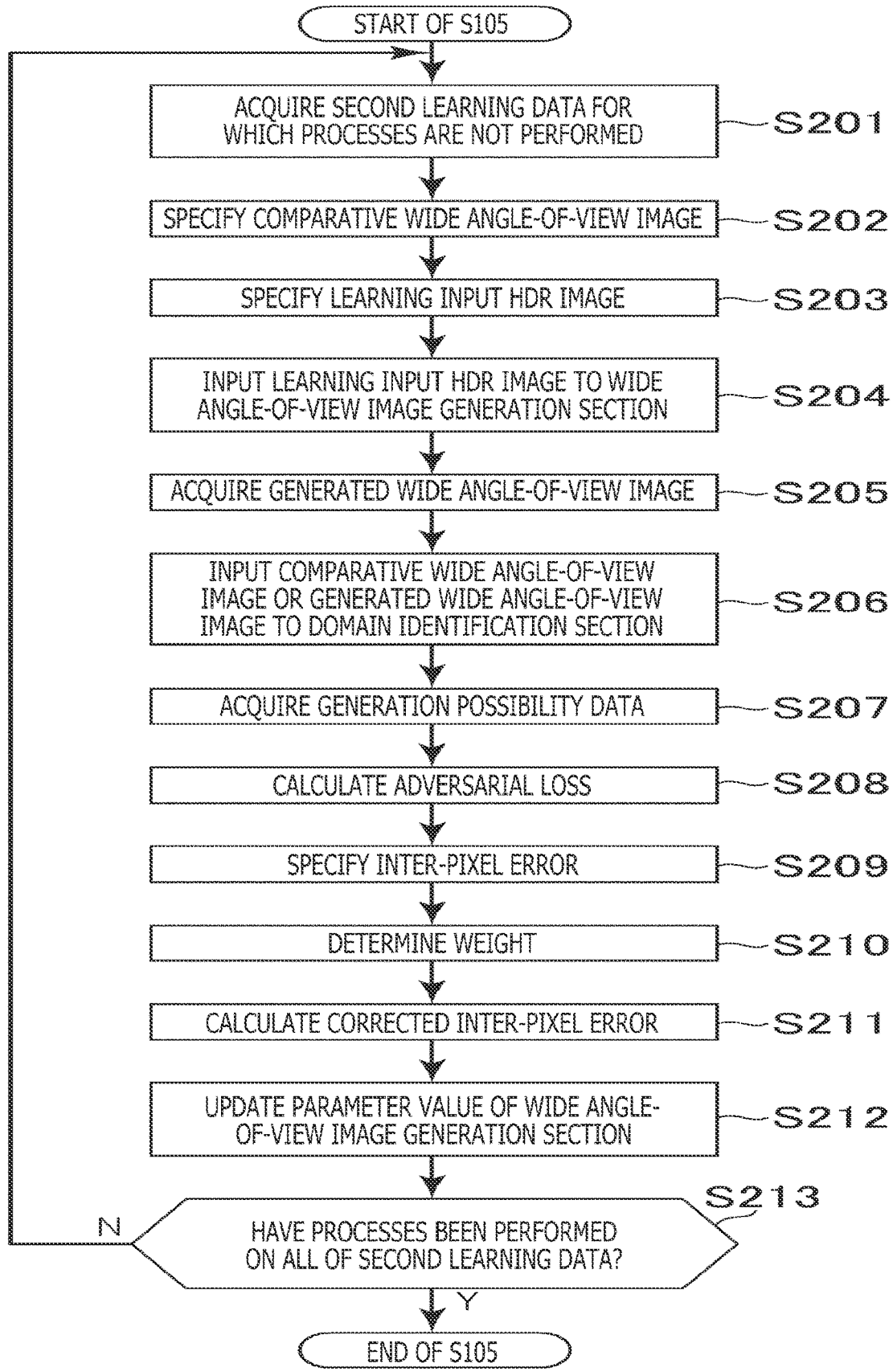
FIG. 11 is a flow chart illustrating an example of the flow of learning processing performed by an image processing device according to an embodiment of the present invention.
Figure 12:
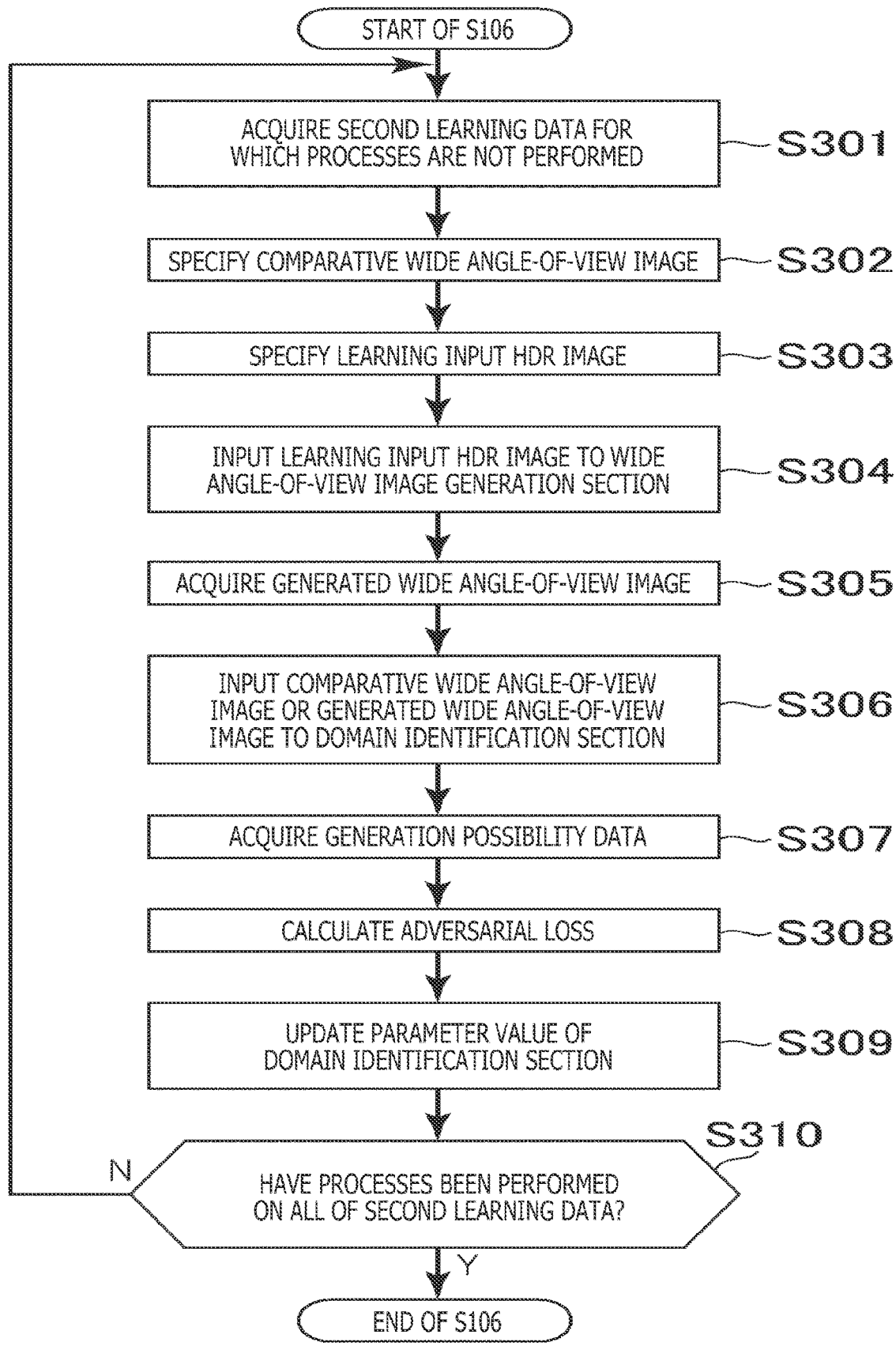
FIG. 12 is a flow chart illustrating an example of the flow of learning processing performed by an image processing device according to an embodiment of the present invention.

Further, although, in the processing example illustrated in FIG. 10 to FIG. 12, a set of second learning data that differs for each of the process indicated in S105 and the process indicated in S106 is used, the same set of second learning data may be used in the process indicated in S105 and the process indicated in S106.

Figure 13:
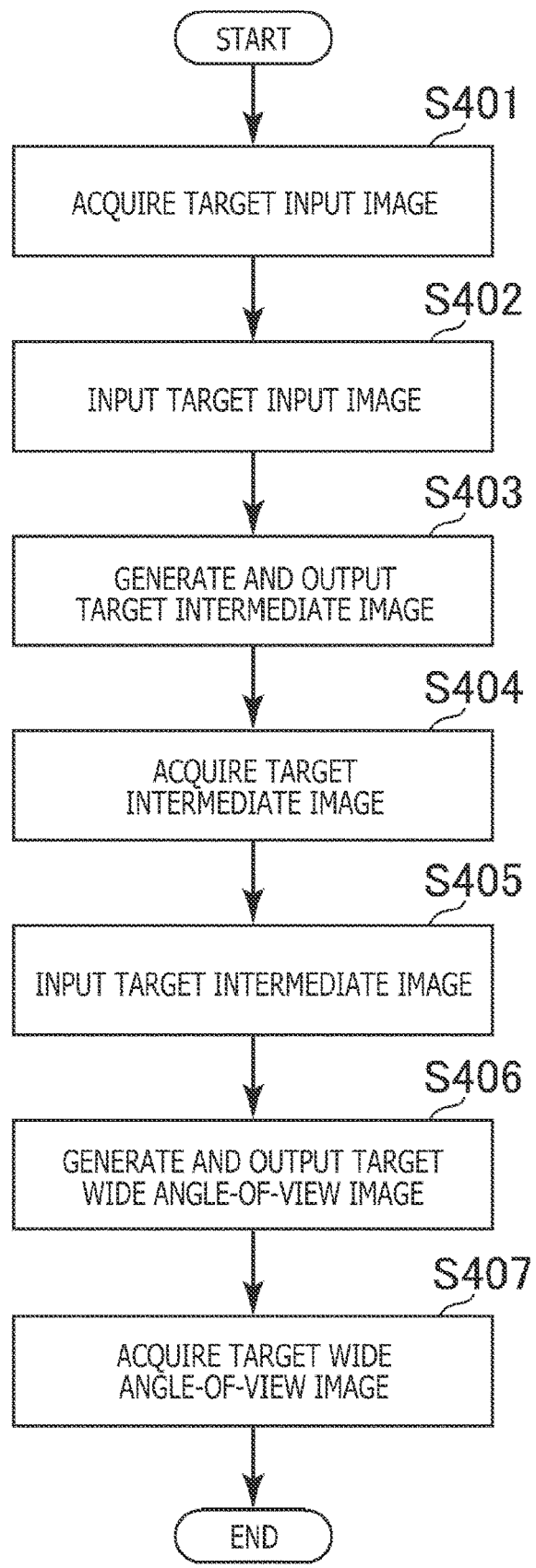
FIG. 13 is a flow chart illustrating an example of the flow of processing for generating a target wide angle-of-view, performed by an image processing device according to an embodiment of the present invention.

Next, an example of the flow of processing for generating the target wide angle-of-view image 50, which is performed by the image processing device 10 according to the present embodiment, will be described referring to a flow chart illustrated as an example in FIG. 13.

First, the target input image acquisition section 68 acquires the target input image 46 (S401).

Then, the target input image acquisition section 68 inputs the target input image 46, which has been acquired in the process indicated in S401, to the HDR image generation section 20 (S402).

Then, the HDR image generation section 20 generates the target intermediate image 48 according to the target input image 46, which has been input in the process indicated in S302, and outputs the target intermediate image 48 (S403).

Then, the target intermediate image acquisition section 70 acquires the target intermediate image 48, which has been output in the process indicated in S403 (S404).

Further, the target intermediate image acquisition section 70 inputs the target intermediate image 48, which has been acquired in the process indicated in S404, to the wide angle-of-view image generation section 28 (S405).

Then, the wide angle-of-view image generation section 28 generates the target wide angle-of-view image 50 according to the target intermediate image 48, which has been input in the process indicated in S405, and outputs the target wide angle-of-view image 50 (S406).

Then, the target wide angle-of-view image acquisition section 72 acquires the target wide angle-of-view image 50, which has been output in the process indicated in S406 (S407), and the processes indicated in the present processing example end.

Note that the present invention is not limited to the above-described embodiment.

Further, the foregoing specific character strings and numerical values above and the specific character strings and numerical values in the drawings are example presentations, and the present invention is not limited to these character strings and numerical values.

The invention claimed is:

1. A learning device comprising:
an input image acquisition section that acquires an input image;
a wide angle-of-view image generation section that, in response to an input of the input image, generates a generated wide angle-of-view image that is an image having a wider angle of view than the input image;
a comparative wide angle-of-view image acquisition section that acquires a comparative wide angle-of-view image that is an image to be compared with the generated wide angle-of-view image; and
a wide angle-of-view image generation learning section that performs learning for the wide angle-of-view image generation section by, on a basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

2. The learning device according to claim 1, further comprising:

an HDR image generation section that, in response to an input of a standard dynamic-range image, generates a generated HDR image that is a high dynamic-range image;
a comparative HDR image acquisition section that acquires a comparative HDR image that is a high dynamic-range image to be compared with the generated HDR image; and
an HDR image generation learning section that performs learning for the HDR image generation section by updating parameter values of the HDR image generation section on a basis of a comparison result between the generated HDR image and the comparative HDR image,
wherein the input image acquisition section acquires, as the input image, the generated HDR image generated by the learned HDR image generation section.

3. An image generation device comprising:
an image acquisition section that acquires a standard dynamic-range image;
an HDR image generation section that, in response to an input of the standard dynamic-range image, generates a high dynamic-range image; and
a wide angle-of-view image generation section that, in response to an input of the high dynamic-range image, generates a wide angle-of-view image having a wider angle of view than the high dynamic-range image,
wherein the wide angle-of-view image generation section is a learned machine learning model, learning being performed by updating parameter values of the wide angle-of-view image generation section on a basis of a comparison result between a generated wide angle-of-view image that the wide angle-of-view image generation section generates in response to an input of an input image, and a comparative wide angle-of-view image to be compared with the generated wide angle-of-view image.

4. The image generation device according to claim 3, wherein the wide angle-of-view image generation section is a learned machine learning model, learning being performed by updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

5. The image generation device according to claim 3, wherein the HDR image generation section is a learned machine learning device, learning being performed by updating parameter values of the HDR image generation section on a basis of a comparison result between the high dynamic-range image, which the HDR image generation section generates in response to the input of the standard dynamic-range image, and another high dynamic-range image to be compared with the high dynamic-range image.

6. A learning method comprising:
acquiring an input image;
generating, in response to an input of the input image, using a wide angle-of-view image generation section, a generated wide angle-of-view image that is an image having a wider angle of view than the input image;
acquiring a comparative wide angle-of-view image that is an image to be compared with the generated wide angle-of-view image; and
performing learning for the wide angle-of-view image generation section by, on a basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

7. An image generation method comprising:

acquiring a standard dynamic-range image;

generating, in response to an input of the standard dynamic-range image, a high dynamic-range image; and generating, in response to an input of the high dynamic-range image, a wide angle-of-view image having a wider angle of view than the high dynamic-range image, wherein the generating includes using a learned machine learning model, learning being performed by updating parameter values on a basis of a comparison result between a generated wide angle-of-view image that the generating step generates in response to an input of an input image, and a comparative wide angle-of-view image to be compared with the generated wide angle-of-view image.

8. A non-transitory, computer readable medium having a computer program stored thereon, which when executed by a computer causes the computer to perform a learning method by carrying out actions, comprising:

acquiring an input image;

generating, in response to an input of the input image, using a wide angle-of-view image generation section, a generated wide angle-of-view image that is an image having a wider angle of view than the input image;

acquiring a comparative wide angle-of-view image that is an image to be compared with the generated wide angle-of-view image; and performing learning for the wide angle-of-view image generation section by, on a basis of a comparison result between the generated wide angle-of-view image and the comparative wide angle-of-view image, updating parameter values of the wide angle-of-view image generation section such that, according to luminance levels of pixels in the comparative wide angle-of-view image or luminance levels of pixels in the generated wide angle-of-view image, update amounts of the parameter values concerning the pixels are increased.

9. A non-transitory, computer readable medium having a computer program stored thereon, which when executed by a computer causes the computer to perform an image generation method by carrying out actions, comprising:

acquiring a standard dynamic-range image;

generating, in response to an input of the standard dynamic-range image, a high dynamic-range image; and generating, in response to an input of the high dynamic-range image, a wide angle-of-view image having a wider angle of view than the high dynamic-range image, wherein the generating includes using a learned machine learning model, learning being performed by updating parameter values on a basis of a comparison result between a generated wide angle-of-view image that the generating step generates in response to an input of an input image, and a comparative wide angle-of-view image to be compared with the generated wide angle-of-view image.

\* \* \* \* \*